(No Model.)

H. N. FRASER.
VESSEL FOR COLLECTING PRECIPITATES.

No. 512,874. Patented Jan. 16, 1894.

WITNESSES:
Gustave Dieterich
L. M. Wachschlager

INVENTOR
Horatio N. Fraser
BY Briesen & Knauth
his ATTORNEYS.

THE NATIONAL LITHOGRAPHING COMPANY,
WASHINGTON, D. C.

UNITED STATES PATENT OFFICE.

HORATIO N. FRASER, OF NEW YORK, N. Y.

VESSEL FOR COLLECTING PRECIPITATES.

SPECIFICATION forming part of Letters Patent No. 512,874, dated January 16, 1894.

Application filed January 23, 1893. Serial No. 459,485. (No model.)

*To all whom it may concern:*

Be it known that I, HORATIO N. FRASER, residing in the city, county, and State of New York, have invented an Improvement in Collecting Precipitates and Vessels Therefor, of which the following is a specification, reference being had to the accompanying drawings, forming part hereof, wherein—

Figure 1:
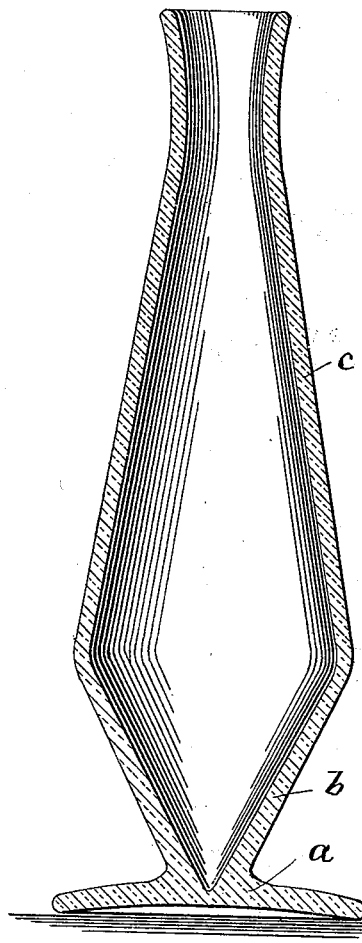
Figure 2:
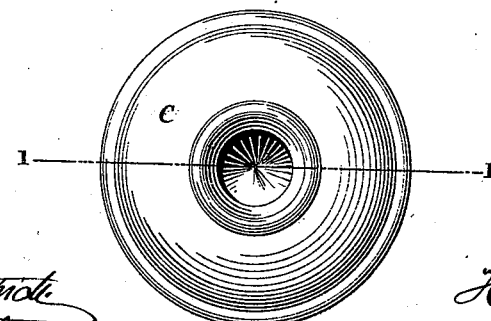

Figure 1 is a central vertical section, on line 1—1 of Fig. 2, of my improved test glass or precipitating vessel. Fig. 2 is a plan view of said vessel.

The invention relates to the collection of precipitates from liquids in which they are suspended and to a vessel of special shape for such purpose.

The main object of the invention is to provide an improvement whereby precipitates collected on the inner face of a test glass or vessel will be massed at the bottom of the glass or vessel, where it comes to a point, and will not be scattered over the whole inner surface of the glass below the surface of the liquid therein, as heretofore.

I form my test glass with a base $a$, a comparatively short flaring section $b$, preferably of conical form with its apex pointing downward, and a part $c$, preferably longer than section $b$ and integral with said section, having reversely inclined sides, and terminating in a neck, into which, when desired, a stopper may be inserted. When a liquid is put in this glass it is clear that a much larger proportion thereof will occupy a position directly over and near the apex of the part $b$, than would be the case in the old form of test glass. The inward inclination of the sides of the upper part $c$ reduces the amount of liquid over the upper portion of the part $b$, and retains the main body of the liquid at or near the central line or axis of the glass, as shown in the drawings. Since precipitates fall in vertical lines, the largest mass thereof will collect at and near the apex of the part $b$, and the film of precipitates which collect on the sides of said part in a considerable distance from the apex will be thin, growing rapidly thinner as the distance from the apex increases, and although the greater bulk of the liquid may be above the top of the part $b$, no precipitates will collect on the inner surface of the part $c$, since the vertically falling precipitates cannot strike or lodge thereon. On the other hand, in the old form of test glass the precipitates extend on the inner surface of the glass to the upper surface of the liquid, although, of course, the film would be thinner and thinner as it approached such surface.

By massing the precipitates as above described, they can be more readily examined, collected, or otherwise treated, than would be possible if they were scattered over a larger surface.

What I claim is—

A precipitate collecting glass or vessel having a short conical section $b$, with its apex at the bottom, a base or stand $a$ formed integral therewith and the oppositely tapering and longer section $c$, above the section $b$, substantially as described.

HORATIO N. FRASER.

Witnesses:
HARRY M. TURK,
C. M. CATLIN.